UNITED STATES PATENT OFFICE.

KOLOMAN RÓKA, OF KONSTANZ, GERMANY, ASSIGNOR TO THE FIRM OF HOLZV-VERKOHLUNGS-INDUSTRIE ACTIEN-GESELLSCHAFT, OF KONSTANZ, BADENIA, GERMANY, A CORPORATION OF GERMANY.

METHOD FOR THE CHLORINATION OF ACETYLENE.

1,418,882.      Specification of Letters Patent.     Patented June 6, 1922.

No Drawing.     Application filed February 3, 1922. Serial No. 533,961.

*To all whom it may concern:*

Be it known that I, KOLOMAN RÓKA, a citizen of Hungary, residing at Konstanz (Badenia), Germany, have invented certain new and useful Improvements in a Method for the Chlorination of Acetylene, of which the following is a specification.

Acetylene is a strongly endothermic compound, the heat which becomes disengaged amounts to approximately 50 calories. The hydrocarbon has therefor the tendency to enter into systems of more stable character that is to say either to separate into its elements C and H or at 4–500° C. to polymerize to benzole in which case 171 calories are liberated, or to associate with other compounds or elements. The associating reactions are partly so strongly exothermic that, as for instance the association with chlorine, they progress like explosions. The chlorine association specially is of considerable technical interest because the acetylene chlorides present either important dissolving or extracting means or valuable intermediate bodies for the production of other chemical products. For these reasons various methods for the chlorination of acetylene have already been proposed, viz:

1.—Such methods in which the combination between $C_2H_2$ and Cl takes place in a liquid medium, for instance in pentachloride of antimony or in protochloride of sulphur in the presence of iron as contact-substance.

2.—Methods in which gases are added to the mixture of acetylene and chlorine which are indifferent to both substances, for instance $CO_2$ whereupon the initiation is effected by chemically acting rays.

3.—Methods, in which the gases are diluted by a solid medium to be brought to reaction in presence of a contact substance or by chemically acting rays.

4.—All these methods possess however in a more or less great degree various technical and economical defects and they produce besides principally only the $C_2H_2Cl_4$ and in addition little $C_2H_2Cl_2$.

The surprising observation has been made which is very important theoretically as well as practically that acetylene in presence of chlorine and of steam, which is an agent against which the chlorine is not indifferent in the presence of carbonaceous substances, can be heated to higher temperatures, for instance 4–500° without decomposing or polymerizing or without reacting with the chlorine in an undesirable manner and that this working method permits a chlorination of the acetylene which can be regulated accurately, in such a manner that, according to the conditions selected, varying quantities of dichlorethylene, trichlorethylene, tetrachlorethane and chlorine-products having a higher boiling point are produced, admixed with steam and hydrochloric acid. At the condensation the condensate separates into two layers, viz a lower heavy layer consisting of the products from chlorination and an upper layer consisting of aqueous hydrochloric acid. After separation of the two layers the further treatment of the products from chlorination follows. In consequence of the great difference between the boiling points of these compounds the mixture can be decomposed without difficulty into its constituents by fractional distillation.

This chlorination method permits therefore to produce all the technically valuable acetylene derivates in one single chlorinating operation. The composition of the chlorinating mixture is determined by the relation between acetylene, chlorine and steam, further by the velocity of the gas, thirdly by the temperature and the progress of the reaction can finally still be influenced by catalysers, such as $CuCl_2$ $FeCl_3$ $CaCl_2$, and others if required.

As can be seen from the foregoing explanation the steam exerts two functions, first it enables to carry out free from danger the chlorination of the acetylene, secondly it permits to let the chlorination proceed in a determined, specially desired, direction.

There is still another function of the steam, if desired there could be supplied to the reaction chamber, by previously superheating either the entire quantity of steam or only part of the same, the heat required for the starting and carrying through of the reaction, whereby the construction of the chlorinating apparatus is considerably simplified.

*Example.*

Acetylene and chlorine in a proportion of 1×2 are sent simultaneously through a clay pipe of 40 millimeters inner diameter and 60 centimetera length, superheated steam being admitted at the same time, for instance 6 volumes of steam for 1 volume of chlorine. At a temperature of 500° C. and at a velocity of 15 liters of acetylene per hour the following products from reaction are obtained in the proportion of 1×6×6×1: dichlorethylene, trichlorethylene, tetrachlorethane and higher chlorinated products.

I claim:—

1. The improved method of chlorinating acetylene which consists in bringing chlorine and acetylene to reaction at high temperature with the aid of steam.

2. The improved method of chlorinating acetylene which consists in bringing chlorine and acetylene to reaction in the presence of a catalyser at high temperature with the aid of steam.

3. The improved method of chlorinating acetylene which consists in bringing chlorine and acetylene to reaction at a temperature between 400 and 500° C. with the aid of steam.

4. The improved method of chlorinating acetylene which consists in bringing chlorine and acetylene to reaction at high temperature with the aid of superheated steam.

5. The method of chlorinating acetylene which consists in treating chlorine and acetylene with superheated steam.

In testimony whereof I affix my signature in presence of two witnesses.

KOLOMAN RÓKA.

Witnesses:
   THOS. H. ANDERSON,
   H. D. SOMMERHOFF.